June 26, 1934.                J. GATTONI                1,964,349
                            PRECISION BALANCE
                        Filed Aug. 24, 1932        2 Sheets-Sheet 1

INVENTOR
John Gattoni
BY
J.S. Wooster
ATTORNEY

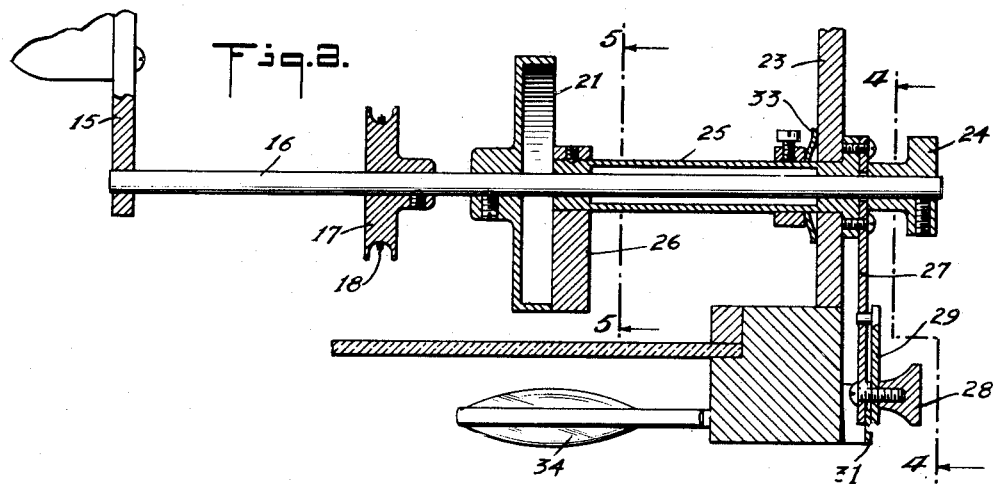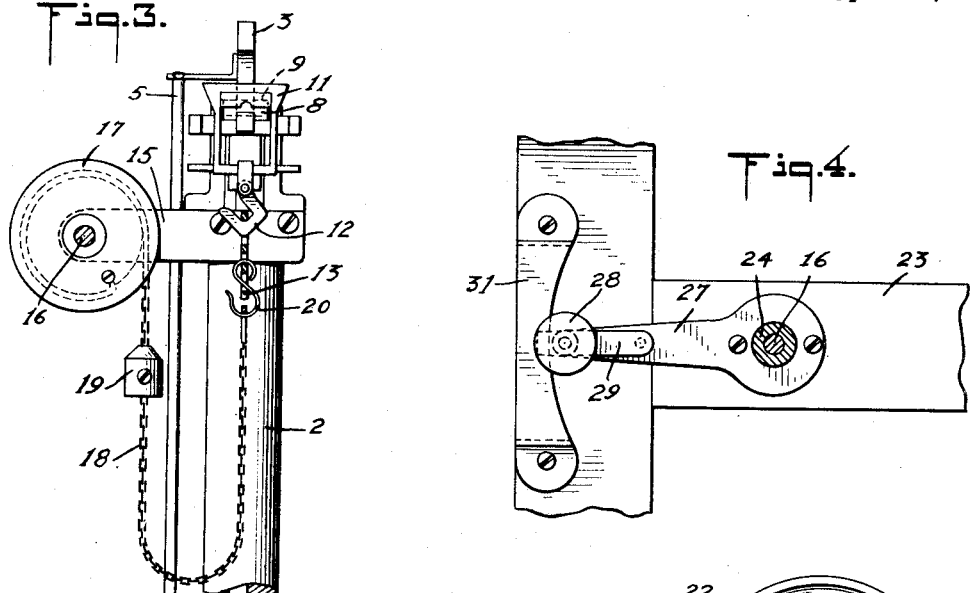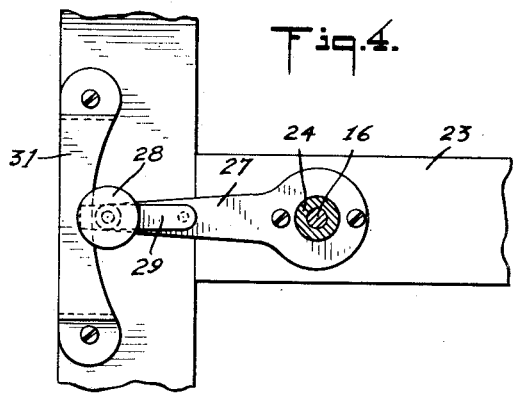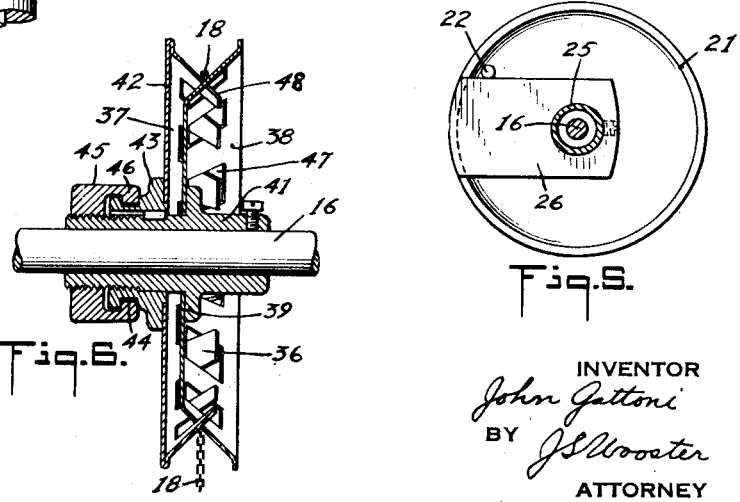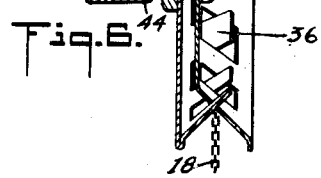

Patented June 26, 1934

1,964,349

UNITED STATES PATENT OFFICE 1,964,349

PRECISION BALANCE

John Gattoni, Union City, N. J., assignor to Seederer-Kohlbusch, Inc., Jersey City, N. J., a corporation of New Jersey Application August 24, 1932, Serial No. 630,228

5 Claims. (Cl. 265—60)

This invention relates to a precision balance.

An object of the invention is to provide means for quickly and accurately weighing various objects of relatively small mass.

Another object is to provide means for easily obtaining very fine and delicate readings.

These and other objects are accomplished by means of a balance having a main indicator, a pivoted beam, and a rotatable shaft upon which a pulley is mounted. A chain is supported from the pulley and one end of the beam. Upon rotation of the shaft, the chain is wound or unwound from the pulley, adding or subtracting weight from one side of the balance, and counterbalancing the weight of an object on the other side of the balance. The vernier reading is taken from indicating means carried by the shaft.

Referring now to the drawings, Fig. 1 is an elevational view of a balance;

Fig. 2 is a horizontal sectional view on the line 2—2 of Fig. 1;

Fig. 3 is a vertical sectional view on the line 3—3 of Fig. 1;

Fig. 4 is a vertical sectional view on the line 4—4 of Fig. 2;

Fig. 5 is a vertical sectional view on the line 5—5 of Fig. 2; and

Fig. 6 is a vertical sectional view of a conical pulley.

Figure 1:
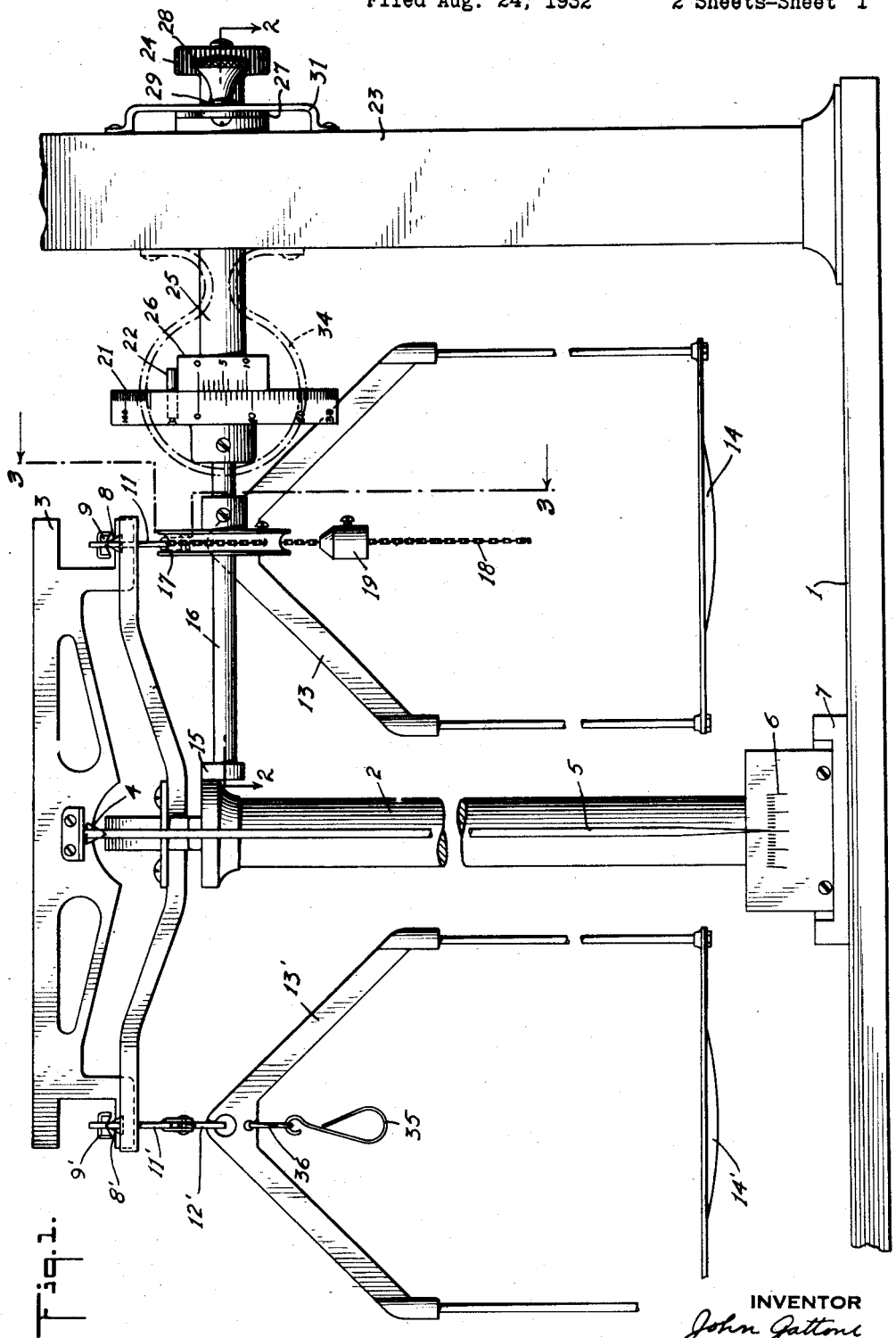

1 is a base upon which is mounted a standard 2. A beam 3 is pivoted at 4 on the standard 2. The beam 3 carries an indicator 5 cooperating with graduated scale 6 mounted on platform 7. The beam carries knife edges 8 and 8' upon which rest the bearings 9 and 9', from which are suspended frames 11 and 11'. Hooks 12 and 12' support bows 13 and 13' and scale pans 14 and 14'. An arm 15 is secured to standard 2 and carries a horizontal rotatable shaft 16. A pulley 17 mounted on the shaft 16 carries one end of a chain 18 having a weight 19. The other end of chain 18 is supported from the end of the beam 3 by means of the hook 20. A graduated disc 21 is mounted on the shaft 16 and carries a pin 22. The shaft 16 passes through the casing 23 and carries at its outer end a knob 24.

A tube 25 concentric with shaft 16 carries a graduated segment 26 adapted to cooperate with graduated disc 21. Tube 25 passes through casing 23 and carries an arm 27 having a knob 28. Knob 28 presses arm 29 against guiding plate 31, and with friction washer 33, tends to hold tube 25 and segment 26 in the desired position. By moving knob 28 in a vertical plane, tube 25 and segment 26 may be rotated without rotation of disc 21 or pulley 17.

The object to be weighed is placed on scale pan 14', and weights are placed on scale pan 14 if the object weighs more than 100 milligrams. The shaft 16 is rotated by means of knob 24, varying the length of chain 18 not wound on pulley 17, and consequently the weight of the right side of the balance. Readings are taken from indicating means 21 and 26 in accordance with the usual vernier practice, pin 22 limiting the rotation of disc 21 with respect to segment 26. A magnifying glass 34 is mounted on casing 23 in front of disc 21 and segment 26.

The scale may be used with or without chain 18. Weight 35 carried by hook 36 of bow 13' is equal in weight to chain 18, and should be removed if chain 18 is removed.

Instead of fixed pulley 17, a conical pulley 37 having an adjustable diameter, may be used. The conical half 38 of the pulley is mounted on flange 39 of sleeve 41, which is secured to shaft 16. The other half 42 of the pulley is mounted on collar 43 having a groove 44. A ring 45 having a collar 46 fitting into groove 44 is screw threaded on sleeve 41. Upon rotation of ring 45, fingers 48 of conical half 42 may be inserted or withdrawn from openings 47, increasing or decreasing the diameter of the pulley. The chain 18 is mounted on a finger 48.

It will be understood that various modifications and changes may be made without departing from the scope of the invention as indicated in the appended claims.

The invention claimed is:

1. In a balance, a standard, a beam pivoted thereon, a rotatable shaft supported from said standard, a conical pulley mounted on said shaft and having an adjustable diameter, a weighted chain carried by said pulley, a graduated disc carried by said shaft, and a graduated segment adapted to cooperate with said graduated disc.

2. In a balance, a standard, a beam pivoted thereon, a rotatable shaft, means for supporting said shaft from said standard, a conical pulley mounted on said shaft and having an adjustable diameter, a weighted chain carried by said pulley and one end of said beam, a graduated disc carried by said shaft, a tube concentric with said shaft, and a graduated segment carried by said tube and adapted to cooperate with said graduated disc.

3. In a balance, a standard, a beam pivoted thereon, an arm carried by said standard, a rotatable shaft carried by said arm, a conical pulley mounted on said shaft and having an adjustable diameter, a weighted chain carried by said pulley and one end of said beam, a graduated disc carried by said shaft, a tube concentric with said shaft, and a graduated segment carried by said tube and adapted to cooperate with said graduated disc.

4. In a balance, a casing, a standard therein, a beam pivoted on said standard, an arm carried by said standard, a rotatable shaft carried by said arm and passing through said casing, a pulley mounted on said shaft, a weighted chain carried by said pulley and one end of said beam, a graduated disc carried by said shaft, a tube concentric with said shaft, a graduated segment carried by said tube and adapted to cooperate with said graduated disc, a magnifying glass carried by said casing, means outside said casing for adjusting said segment, and means outside said casing for rotating said shaft.

5. In a balance, a casing, a standard therein, a beam pivoted on said standard, an arm carried by said standard, a rotatable shaft carried by said arm and passing through said casing, a conical pulley mounted on said shaft and having an adjustable diameter, a weighted chain carried by said pulley and one end of said beam, a graduated disc carried by said shaft, a tube concentric with said shaft, a graduated segment carried by said tube and adapted to cooperate with said graduated disc, a magnifying glass carried by said casing, means outside said casing for adjusting said segment, and means outside said casing for rotating said shaft.

JOHN GATTONI.